Feb. 2, 1971  E. PANNEN ET AL  3,560,841
EXCITER DEVICE TO TRANSFER HIGH EXCITATION CURRENTS
BY MEANS OF BRANCH CIRCUITS AND PLURAL SLIP RINGS
Filed June 17, 1968  2 Sheets-Sheet 1
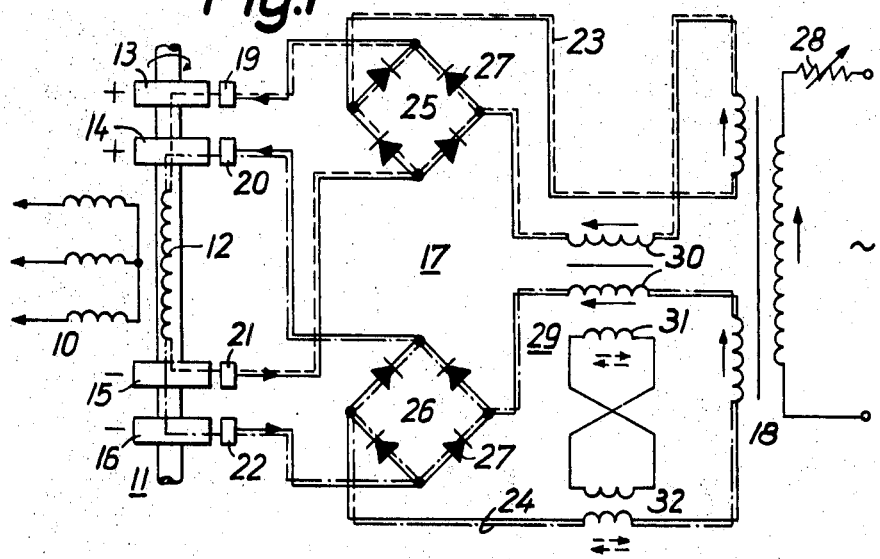
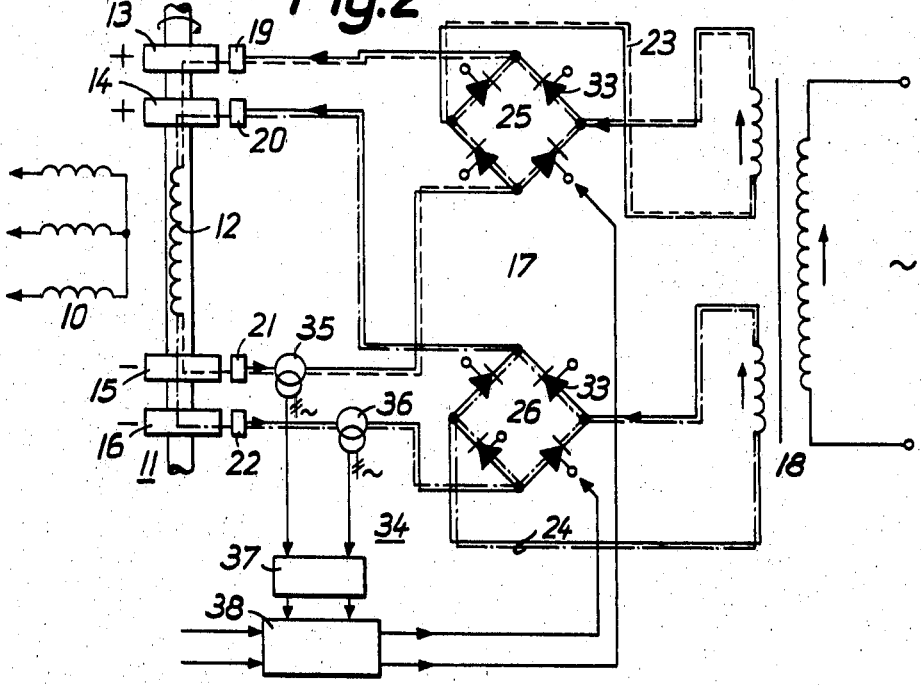
INVENTORS:
Egon Pannen
Gerhard Lanz
BY *Spencer & Kaye*
Attorneys United States Patent Office 3,560,841
Patented Feb. 2, 1971

3,560,841
EXCITER DEVICE TO TRANSFER HIGH EXCITATION CURRENTS BY MEANS OF BRANCH CIRCUITS AND PLURAL SLIP RINGS
Egon Pannen and Gerhard Lanz, Mulheim (Ruhr), Germany, assignors to Licentia Patent-Verwaltungs-G.m.b.H., Frankfurt am Main, Germany
Filed June 17, 1968, Ser. No. 737,485
Claims priority, application Germany, June 20, 1967,
L 56,772
Int. Cl. H02k *13/02;* H02p *9/30*
U.S. Cl. 322—73                          4 Claims

ABSTRACT OF THE DISCLOSURE

An exciter device for large alternators wherein direct excitation current is supplied from a stationary rectifier means having a plurality of separate current branch circuits to the inductor or field winding of the alternator, having opposite poles at its ends and provided with at least two slip rings at each pole. The slip rings at each pole are each electrically connected to a separate current branch circuit via their respective brushes and to each other via the inductor and all of the branch circuits are electrically connected to a current regulating device so that the current in each branch circuit is equalized.

BACKGROUND OF THE INVENTION

Due to the increase in current requirements, the rated power of generators has steadily grown higher. In the currently employed generators of the order of 600 mva., excitation currents occur up to 5000 amperes. Currents of this magnitude can still be handled with conventional means, i.e. with carbon brushes and with one slip ring per pole. As is known, carbon brushes have only a certain permissible current density which cannot be further increased due to technical problems related to cooling. When the current to be transmitted increases, the number of brushes would have to be increased. However, too close an arrangement on the slip rings leads to a rise in current and frictional heat which again results in an unduly high heating of the slip rings and of the brushes.

A further increase of the rated power by means of liquid-cooled inductors will bring about a further increase in the excitation current. In particular, liquid-cooled inductors having directly cooled conductors require large conductor cross sections in order to provide room for a favorable coolant channel. Large conductor cross sections, result in high excitation currents. This applies to synchronous generators, particularly to turbogenerators, as well as to synchronous motors of any desired frequency and phase value.

In order to handle the high excitation currents, liquid slip rings have been proposed. These slip rings operate either with mercury or with an alloy of sodium and potassium (NaK). Both media have certain drawbacks in practical application. Whereas mercury vapors are a danger to health, NaK in connection with humidity is combustible. Special additional safety measures must therefore be taken with liquid slip rings.

SUMMARY OF THE INVENTION

It is the object of the present invention to construct an exciter device in such a manner that even the very high excitation currents occurring at high rated power can be transmitted and safe operational behavior is thus guaranteed for the conventional slip rings and brushes even when they are used for very high excitation currents.

The present invention relates to an exciter device with slip rings and brushes to transmit high excitation currents, preferably for large synchronous external-armature alternators, wherein the direct excitation current is taken from a stationary rectifier device having two or more branch current circuits. In the conventional exciter devices of this type the branch current circuits are connected in parallel on their D.C. and on their A.C. side and are connected to the slip rings as a parallel circuit. A plurality of rectifier bridges can here be connected in parallel within each branch current circuit.

The present invention provides at least two separate slip rings for each pole of an exciter inductor or field winding. The slip rings are individually fed by separate branch current circuits and slip rings at the same pole of the inductor are connected to each other. A current regulating device for effecting a uniform current load or current equalization for the separate branch circuits and slip rings, respectively, is provided and is common to all branch circuits.

By this arrangement the current regulating device assures, that each branch circuit, and thus each slip ring, carries the same amount of current by comparing the current load in the individual branch circuits. The unequal current loads in the branch circuits resulting from differing resistances of the individual brushes, slip rings and their leads and the resulting unequal current loads in the slip rings are thus equalized so that a uniform current load is provided for all slip rings. Thus overloading the brushes of one slip ring while only lightly loading those of another is avoided.

When diodes are used, the current regulating device is advantageously provided on the A.C. side of the exciter device. When thyristors are used, these are controlled by the current regulating device. The current regulating device can be connected either on the A.C. or on the D.C. side of the exciter device as desired. The currents of the branch circuits measured in this current regulating device are applied to a control member of the device and bring about, in conjunction with a voltage regulator of known construction which is always present in such exciter devices, the equalization of previously unequal currents.

BRIEF DESCRIPTION OF THE DRAWINGS

FIG. 1 is a schematic view of one embodiment according to the invention.

FIG. 2 is a schematic view of another embodiment according to the invention.

DETAILED DESCRIPTION OF THS PREFERRED EMBODIMENTS

Figure 3:
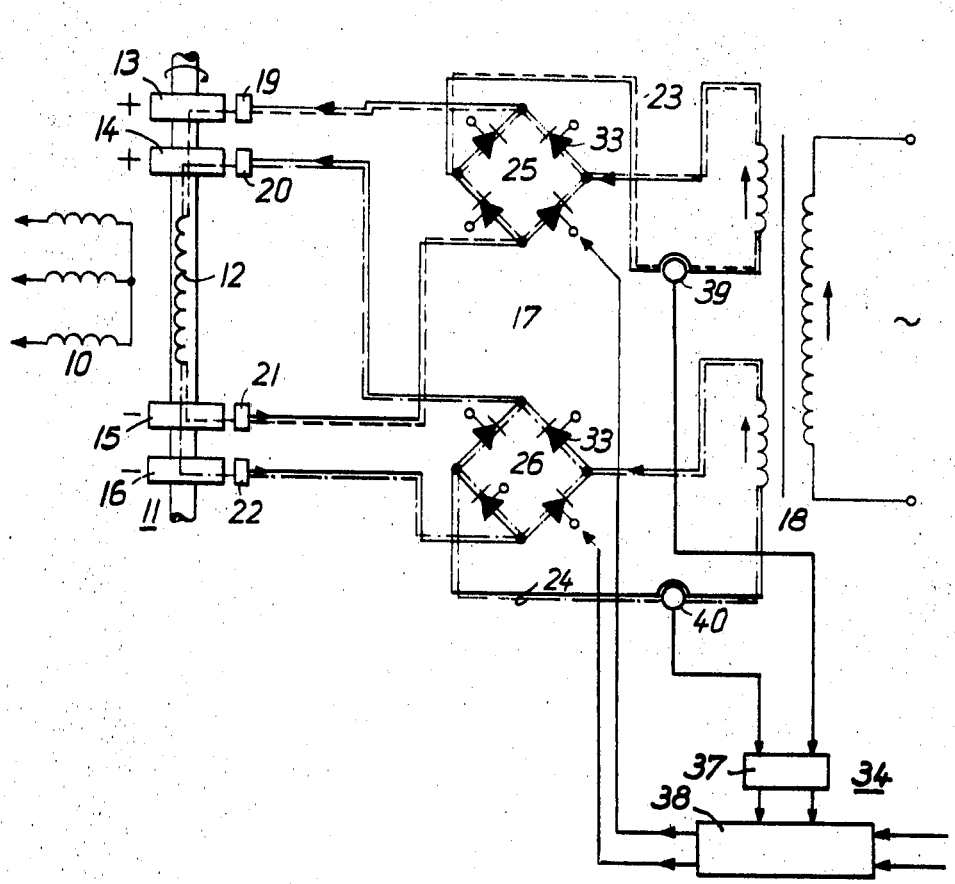
FIG. 3 is a schematic view of yet another embodiment according to the invention.

In the drawings, FIGS. 1 and 2 show two embodiments according to the present invention, each being represented in the form of a schematic diagram of a circuit which is used in a polyphase synchronous alternator. For reasons of simplicity the A.C. side of the exciter device is shown in FIGS. 1 and 2 to have but one phase. In reality it is usually constructed to have three phases.

The synchronous alternator, whose stator winding is marked 10, is excited from its inductor 11. The inductor 11 has only one winding 12. At one end of this winding 12 is the positive pole where there are two slip rings 13, 14 and at the other end of winding 12 is the negative pole where there are two slip rings 15, 16. To generate the direct exciter current for the winding 12 a rectifier device 17 is provided which is fed by a hybrid transformer 18. The direct exciter current coming from the rectifier device 17 is fed to the winding 12 at the slip rings 13, 14 via brushes 19, 20, and is discharged from winding 12 at slip rings 15, 16, via brushes 21, 22. The rectifier device 17 is divided into two branch current circuits which are shown in dashed, and dot-dash lines, respectively, and which are marked 23 and 24, respectively. The branch circuit 23 has a rectifier bridge 25 and the branch circuit 24 a rectifier bridge 26. The rectifier bridges 25, 26 are provided with diodes 27. Depending on the load, one or a plurality of rectifier bridges can be connected in parallel to the rectifier bridges 25, 26. The branch circuit 23 is also electrically connected to the two slip rings 13, 15 and the branch circuit 24 is electrically connected to the two slip rings 14, 16. Thus, current is individually fed to the two slip rings 13, 14 at the positive pole and, correspondingly, current is individually discharged from the two slip rings 15, 16 at the negative pole. When diodes 27 are used in the rectifier bridges 25 and 26, the transformer 18 must be controlled on its primary side. This is done with a voltage regulating device 28 of known construction. Instead of the transformer 18, a polyphase wave generator can be employed, the voltage of which is also controlled in a known manner on its exciter side. Two galvanically separated windings are then accommodated in the stator in star connection (similar to the known double-star connection). Each one of the two windings is connected together with one rectifier group.

In order to achieve as much equalization as possible between the currents in the two separated exciter current branch circuits, a current regulating device 29 with a bias current transformer 30 is provided on the A.C. side of the exciter device. If the currents in the two separate branch circuits 23 and 24 are equal the fluxes they create in the yoke of the magnet of transformer 30 are also equal. Since the fluxes are opposite in direction to each other, they cancel each other out. If, however, the current in one of the two branch circuits is greater, a flux differential results, i.e. a net flux in one or the other direction results according to which current is stronger. This difference in flux generates a corresponding current in another winding 31 which is magnetically coupled to the bias current transformer 30. This corresponding current is fed to a transformer 32 in the branch circuit 24 in such a manner that it tends to increase the current in this circuit if it is less than that in the other circuit. In this manner, a simple automatic equalization of the currents in both exciter branch circuits 23 and 24 is achieved. The current transformer 32 can also be located in the branch circuit 23.

FIG. 2 shows a similar arrangement as FIG. 1. Here, however, the rectifier bridges 25 and 26 are provided with thyristors 33. Moreover, the generator voltage (or reactive load in parallel operation) is here not controlled from the primary side of the hybrid transformer 18 but via the thyristors 33. The transformer 18 here thus operates with constant terminal voltage. Instead of the transformer 18, a polyphase wave generator with two galvanically separated stator windings can be used, which is then regulated to have a constant terminal voltage.

A current regulating device 34 is provided for equalizing the current in the two exciter current branch circuits 23 and 24. Current regulating device 34 receives its controlling pulses from the D.C. side. The current regulating device 34 of this construction essentially comprises two D.C. converters 35 and 36 in the branch current circuits 23, 24 and a control member 37 which is a part of a voltage regulator 38. The secondary currents of the two converters 35 and 36 are fed to the voltage regulator 38 via the control member 37. The branch current regulation is subordinate to the voltage regulation which is effected by controlling the firing of the thyristors 33 (e.g. by controlled gating). Referring to FIG. 3, the current regulating device 34 can also receive its pulses from the A.C. side. For this purpose two current converters 39, 40 can be provided on the A.C. side instead of the D.C. converters 35, 36. These converters are shown in the embodiment according to FIG. 3.

It will be understood that the above description of the present invention is susceptible to various modifications, changes, and adaptations, and the same are intended to be comprehended within the meaning and range of equivalents of the appended claims.

What is claimed is:

1. In an apparatus for providing high excitation currents to the field winding of an alternator wherein direct excitation currents are supplied to the field winding via slip rings and brushes disposed at the opposite polarity ends of the field winding from a stationary rectifier means having an A.C. side and a D.C. side and including a plurality of similar branch circuits, the improvement comprising:
   (a) said branch circuits being galvanically separated from each other at the A.C. sides thereof, and, except for the connections via the said field winding, at the D.C. sides thereof;
   (b) at least two such slip rings connected to said field winding at each end pole thereof, said slip rings at each pole being electrically connected via their respective brushes to separate ones of said branch circuits; and
   (c) current regulating means connected to each of said branch circuits for regulating all branch circuits electrically and equalizing the currents in the separate branch circuits and slip rings.

2. The apparatus as defined in claim 1 wherein such rectifier device comprises a plurality of diodes and said current regulating means is provided on the A.C. side of said rectifier device.

3. The apparatus as defined in claim 1 wherein such rectifier device comprises a plurality of thyristors and said current regulating means detects the branch currents on the A.C. side of said rectifier device.

4. The apparatus as defined in claim 1 wherein such rectifier device comprises a plurality of thyristors and said current regulating means detects the branch currents on the D.C. side of said rectifier device.

References Cited

UNITED STATES PATENTS

| 3,254,302 | 5/1966 | Boykin et al. | 307—58X |
| 3,353,089 | 11/1967 | Garrett | 322—63X |

FOREIGN PATENTS

| 933,041 | 9/1955 | Germany | 310—136 |

ORIS L. RADER, Primary Examiner

H. HUBERFELD, Assistant Examiner

U.S. Cl. X.R.

307—58; 310—127, 147; 322—75